US010720138B2

(12) United States Patent
Zhou et al.

(10) Patent No.: US 10,720,138 B2
(45) Date of Patent: Jul. 21, 2020

(54) SDR-BASED ADAPTIVE NOISE CANCELLATION (ANC) SYSTEM

(71) Applicant: Cirrus Logic International Semiconductor Ltd., Edinburgh (GB)

(72) Inventors: Dayong Zhou, Austin, TX (US); John L. Melanson, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 15/495,746

(22) Filed: Apr. 24, 2017

(65) Prior Publication Data

US 2018/0308466 A1 Oct. 25, 2018

(51) Int. Cl.
*G10K 11/178* (2006.01)
*H04M 1/60* (2006.01)
*H04M 1/03* (2006.01)

(52) U.S. Cl.
CPC ...... *G10K 11/178* (2013.01); *G10K 11/17827* (2018.01); *G10K 11/17854* (2018.01); *G10K 11/17881* (2018.01); *G10K 11/17885* (2018.01); *H04M 1/6008* (2013.01); *G10K 2210/108* (2013.01); *G10K 2210/1081* (2013.01); *G10K 2210/3026* (2013.01); *G10K 2210/3028* (2013.01); *G10K 2210/3054* (2013.01); *H04M 1/03* (2013.01)

(58) Field of Classification Search
CPC ... G10K 11/175; G10K 11/178–17885; G10K 2210/3026; G10K 2210/3028; G10K 2210/3014; G10K 2210/3022; G10K 2210/3023; G10K 2210/30231; G10K 2210/506; G10K 2210/511; H03H 21/0001; H03H 21/0012

USPC .......... 381/71.1–71.14, 72, 73.1, 94.1–94.9; 708/322

See application file for complete search history.

(56) References Cited

U.S. PATENT DOCUMENTS

| 6,275,591 | B1 * | 8/2001 | Hsueh | G01H 3/08 |
| | | | | 381/71.11 |
| 9,036,816 | B1 * | 5/2015 | Ayrapetian | H04B 3/232 |
| | | | | 379/406.13 |
| 9,142,207 | B2 | 9/2015 | Hendrix et al. | |

(Continued)

FOREIGN PATENT DOCUMENTS

| EP | 0751619 A1 | 1/1997 |
| EP | 2257082 A1 | 12/2010 |

(Continued)

*Primary Examiner* — Xu Mei
(74) *Attorney, Agent, or Firm* — Norton Rose Fulbright US LLP

(57) ABSTRACT

The overall performance of an ANC system may be improved by configuring the ANC system to perform adaption in the frequency domain. The ANC systems may be configured to update an algorithm of an adaptive filter based, at least in part, on the first input signal, the second input signal, and a feedback signal that is based on an output of the adaptive filter. Updating may include changing parameters of the algorithm based on a SDR based, at least in part, on the first input signal. Updating may also include normalizing a step size and processing at least full band information for the input signal in a frequency domain to generate coefficient values for the algorithm. Updating may also include applying a frequency domain magnitude constraint on adaptive filter coefficients.

17 Claims, 12 Drawing Sheets

(56) References Cited

U.S. PATENT DOCUMENTS

| | | | |
|---|---|---|---|
| 2005/0147235 A1* | 7/2005 | Telukuntla | H04M 9/082 |
| | | | 379/406.01 |
| 2011/0299695 A1 | 12/2011 | Nicholson | |
| 2012/0259626 A1 | 10/2012 | Li et al. | |
| 2013/0301847 A1 | 11/2013 | Alderson et al. | |
| 2014/0112488 A1* | 4/2014 | Kim | H04R 3/02 |
| | | | 381/66 |
| 2014/0307887 A1 | 10/2014 | Alderson | |
| 2015/0063581 A1 | 3/2015 | Tani et al. | |
| 2015/0078567 A1* | 3/2015 | Mani | G10K 11/175 |
| | | | 381/66 |
| 2016/0372106 A1* | 12/2016 | Hanazono | F24F 13/24 |

FOREIGN PATENT DOCUMENTS

| | | |
|---|---|---|
| EP | 2987160 A1 | 2/2016 |
| GB | 2455827 A | 6/2009 |
| WO | 95/20841 A1 | 8/1995 |
| WO | 2012075343 A2 | 6/2012 |
| WO | 2014172006 A | 10/2014 |

\* cited by examiner

SDR-BASED ADAPTIVE NOISE CANCELLATION (ANC) SYSTEM

FIELD OF THE DISCLOSURE

The instant disclosure relates to adaptive noise cancellation (ANC) systems. More specifically, portions of this disclosure relate to adaptation control of a frequency-domain ANC system.

BACKGROUND

Wireless telephones, such as mobile/cellular telephones and cordless telephones, and other consumer audio devices, such as mp3 players, are in widespread use. Performance of such devices with respect to audio intelligibility can be improved by providing noise canceling using a microphone. In noise cancellation the microphone measures ambient acoustic events and then inserts an anti-noise signal into the output of the device to cancel the ambient acoustic events measured by the microphone. Because the acoustic environment around personal audio devices can change dramatically, depending on the sources of noise that are present and the position of the device itself, an adaptive noise cancellation (ANC) system may be employed to adapt the noise canceling to take into account environmental changes. However, numerous drawbacks are associated with conventional time-domain implementations of ANC systems. In particular, conventional ANC systems can be complex, can consume significant power, and can generate undesirable results under certain circumstances.

Shortcomings mentioned here are only representative and are included simply to highlight that a need exists for improved electrical components, particularly for improved ANC systems. Embodiments described herein address certain shortcomings but not necessarily each and every one described here or known in the art.

SUMMARY

The performance of an ANC system may be improved by configuring the adaptive filter to adapt based on particular data received from the microphone input. In some embodiments, aspects of the adaptive filter may be adjusted based on a signal-to-disturbance ratio (SDR). For example, a step size of the adaptive filter for the secondary path identification (SE(z)) may be adjusted based on ambient noise spectrum; a step size of the adaptive filter for the controlling filter (W(z)) may be adjusted based on disturbance noise spectrum. In particular, the step size may be adjusted based on a signal-to-disturbance ratio (SDR) to achieve a desired ANC performance level, such as to increase or decrease a rate of convergence of the adaptive filters. The SDR may be estimated in the ANC system through ambient noise measurements from the reference signal and signal magnitude on the input playback signal, or through other signals. In some embodiments, the SDR estimation may be for individual frequency bins. In some embodiments, the step size may be normalized.

The performance of the ANC system may be improved by detecting acoustic events received by the microphone and adjusting operation of the ANC system to reduce undesired results of the rapid changes during those acoustic events. Certain acoustic events can cause an ANC system to diverge or otherwise interact with the desired output to generate unpleasant interference for the user. For example, acoustic disturbances such as ambient tone, howling, and wind and scratch noise can cause an adaptive filter of an ANC system to generate undesirable noise. The undesirable results from the ANC system may be reduced or eliminated by using a controller to detect acoustic events from the microphone input and executing operations to reduce divergence or interaction of the adaptive filter.

In some embodiments of an ANC system, when tone disturbance is detected, instead of freezing the full band adaptive filter, the filter adaptation may be held relatively constant at frequency bins around a frequency of the detected tone disturbance. In some embodiments, when howling is detected, instead of muting full band anti-noise, the anti-noise strength may be reduced at frequency bins near a frequency of the howling. In some embodiments, when winds or scratches are detected, instead of muting full band anti-noise the adaptive filter may be configured to generate high-frequency anti-noise signals at or near the frequency of the detected winds or scratches.

The performance of the ANC system may be improved by constraining magnitude of the adaptive filter. For example, an unconstrained controller in an ANC system may cause the adaptive filter to diverge or generate unwanted noise. A spectrum gain constraint may be applied in the ANC system to reduce instances in which the adaptive filter would diverge, or decrease the rate of the divergence, and thus decrease unwanted noise in the ANC system output.

Aspects of these ANC system improvements may be combined in part or in whole in an ANC system. Furthermore, some ANC system improvements may be implemented in different ANC systems, including time-domain and frequency-domain ANC systems.

The overall performance of an ANC system may be improved by configuring the ANC system to perform adaption in the frequency domain. Controlling the adaptation of the ANC system in the frequency-domain offers many advantages over conventional time domain systems. For example, with a frequency-domain ANC system, less instructions are needed to perform common ANC tasks, the ANC system may converge faster, frequency-specific control may be performed, and the overall robustness of the ANC system may be improved.

According to one embodiment, a method includes: receiving a first input signal for reproduction through a transducer; receiving a second input signal from a reference microphone and/or an error microphone; and updating an algorithm of an adaptive filter based, at least in part, on the first input signal, the second input signal, and a feedback signal that is based on an output of the adaptive filter by changing parameters of the algorithm based on a signal-to-disturbance ratio (SDR) based, at least in part, on the first input signal. A controller may be configured in software or hardware to perform this method or similar methods.

In another embodiment, a method includes: receiving a first input signal for reproduction through a transducer; receiving a second input signal from a reference microphone and/or an error microphone; updating an algorithm for an adaptive filter based, at least in part, on the first input signal, the second input signal, and a feedback signal that is based on an output of the adaptive filter; and wherein the step of updating the algorithm of the adaptive filter comprises processing at least full band information for the input signal in a frequency domain to generate coefficient values for the algorithm, and wherein the step of updating the algorithm of the adaptive filter comprises normalizing the step size. For example, the step size may be normalized using at least full band information in each frequency bin. A controller may be configured in software or hardware to perform this method or similar methods.

In yet another embodiment, a method includes: receiving a first input signal for reproduction through a transducer; receiving a second input signal from a reference microphone and/or an error microphone; determining if a disturbance is present at a first frequency in the second input signal received from the reference microphone and/or error microphone; and updating an algorithm of an adaptive filter based, at least in part, on the first input signal, the second input signal, and a feedback signal that is based on an output of the adaptive filter by changing parameters of the algorithm such that the adaptive filter adapts around the first frequency differently than other frequencies when the disturbance is present. A controller may be configured in software or hardware to perform this method or similar methods.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed systems and methods, reference is now made to the following descriptions taken in conjunction with the accompanying drawings. In the appended figures, similar components or features may have the same reference label. Further, various components of the same type may be distinguished by following the reference label with a second label that distinguishes among the similar components. If just the first reference label is used in the specification, the description is applicable to any one of the similar components having the same first reference label irrespective of the second reference label.

DETAILED DESCRIPTION

Figure 1A:
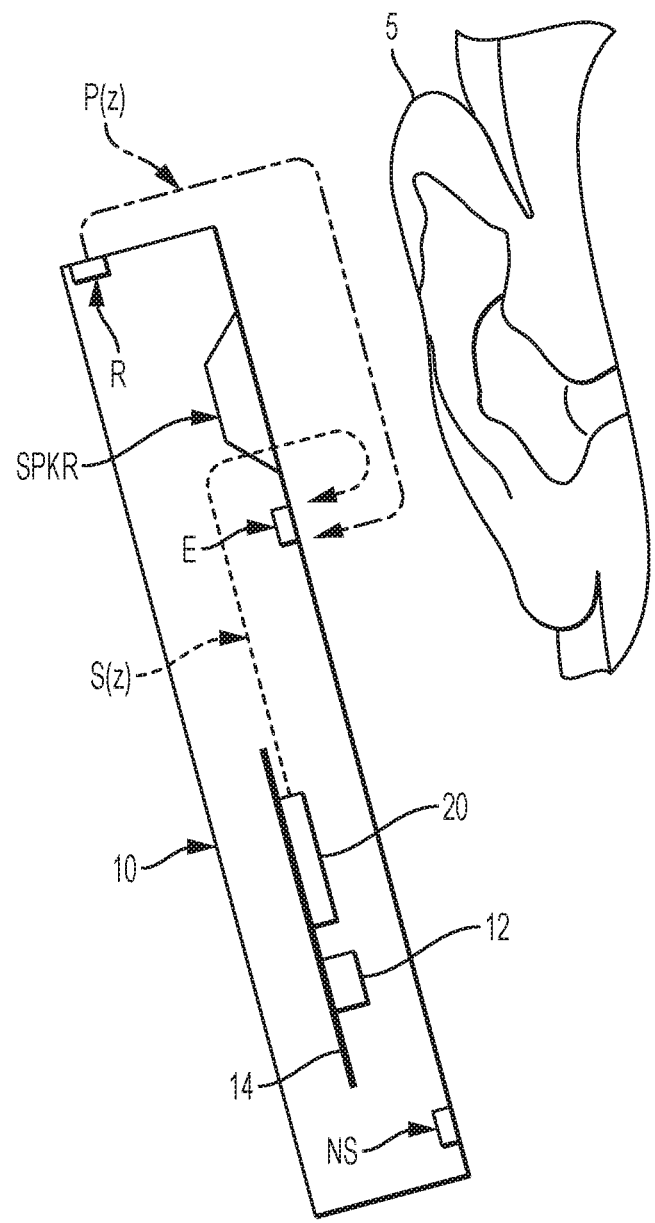
FIG. 1A is an illustration of an example wireless mobile telephone in accordance with embodiments of the present disclosure.

FIG. 1A is an illustration of an example wireless mobile telephone in accordance with embodiments of the present disclosure. In FIG. 1A, a wireless telephone 10 as illustrated in accordance with embodiments of the present disclosure is shown in proximity to a human ear 5. Wireless telephone 10 is an example of a device in which techniques in accordance with embodiments of the invention may be employed, but it is understood that not all of the elements or configurations embodied in illustrated wireless telephone 10, or in the circuits depicted in subsequent illustrations, are required in order to practice the invention recited in the claims. Wireless telephone 10 may include a transducer, such as speaker SPKR, that reproduces distant speech received by wireless telephone 10, along with other local audio events such as ringtones, stored audio program material, injection of near-end speech (i.e., the speech of the user of wireless telephone 10) to provide a balanced conversational perception, and other audio that requires reproduction by wireless telephone 10, such as sources from webpages or other network communications received by wireless telephone 10 and audio indications such as a low battery indication and other system event notifications. A near-speech microphone NS may be provided to capture near-end speech, which is transmitted from wireless telephone 10 to the other conversation participant(s).

Wireless telephone 10 may include ANC circuits and features that inject an anti-noise signal into speaker SPKR to improve intelligibility of the distant speech and other audio reproduced by speaker SPKR. A reference microphone R may be provided for measuring the ambient acoustic environment, and may be positioned away from the typical position of a user's mouth, so that the near-end speech may be minimized in the signal produced by reference microphone R. Another microphone, error microphone E, may be provided in order to further improve the ANC operation by providing a measure of the ambient audio combined with the audio reproduced by speaker SPKR close to ear 5, when wireless telephone 10 is in close proximity to ear 5. In different embodiments, additional reference and/or error microphones may be employed. Circuit 14 within wireless telephone 10 may include an audio CODEC integrated circuit (IC) 20 that receives the signals from reference microphone R, near-speech microphone NS, and error microphone E and interfaces with other integrated circuits such as a radio-frequency (RF) integrated circuit 12 having a wireless telephone transceiver. In some embodiments of the disclosure, the circuits and techniques disclosed herein may be incorporated in a single integrated circuit that includes control circuits and other functionality for implementing the entirety of the personal audio device, such as an MP3 player-on-a-chip integrated circuit. In these and other embodiments, the circuits and techniques disclosed herein may be implemented partially or fully in software and/or firmware embodied in computer-readable media and executable by a controller or other processing device.

In general, ANC techniques of the present disclosure measure ambient acoustic events (as opposed to the output of speaker SPKR and/or the near-end speech) impinging on reference microphone R, and by also measuring the same ambient acoustic events impinging on error microphone E, ANC processing circuits of wireless telephone 10 adapt an anti-noise signal generated from the output of reference microphone R to have a characteristic that minimizes the amplitude of the ambient acoustic events at error microphone E. Because acoustic path P(z) extends from reference microphone R to error microphone E, ANC circuits are effectively estimating acoustic path P(z) while removing effects of an electro-acoustic path S(z) that represents the response of the audio output circuits of CODEC IC 20 and the acoustic/electric transfer function of speaker SPKR including the coupling between speaker SPKR and error microphone E in the particular acoustic environment, which may be affected by the proximity and structure of ear 5 and other physical objects and human head structures that may be in proximity to wireless telephone 10, when wireless telephone 10 is not firmly pressed to ear 5. While the illustrated wireless telephone 10 includes a two-microphone ANC system with a third near-speech microphone NS, some aspects of the present invention may be practiced in a system that does not include separate error and reference microphones, or a wireless telephone that uses near-speech microphone NS to perform the function of the reference microphone R. Also, in personal audio devices designed only for audio playback, near-speech microphone NS will generally not be included, and the near-speech signal paths in the circuits described in further detail below may be omitted, without changing the scope of the disclosure, other than to limit the options provided for input to the microphone covering detection schemes.

Figure 1B:
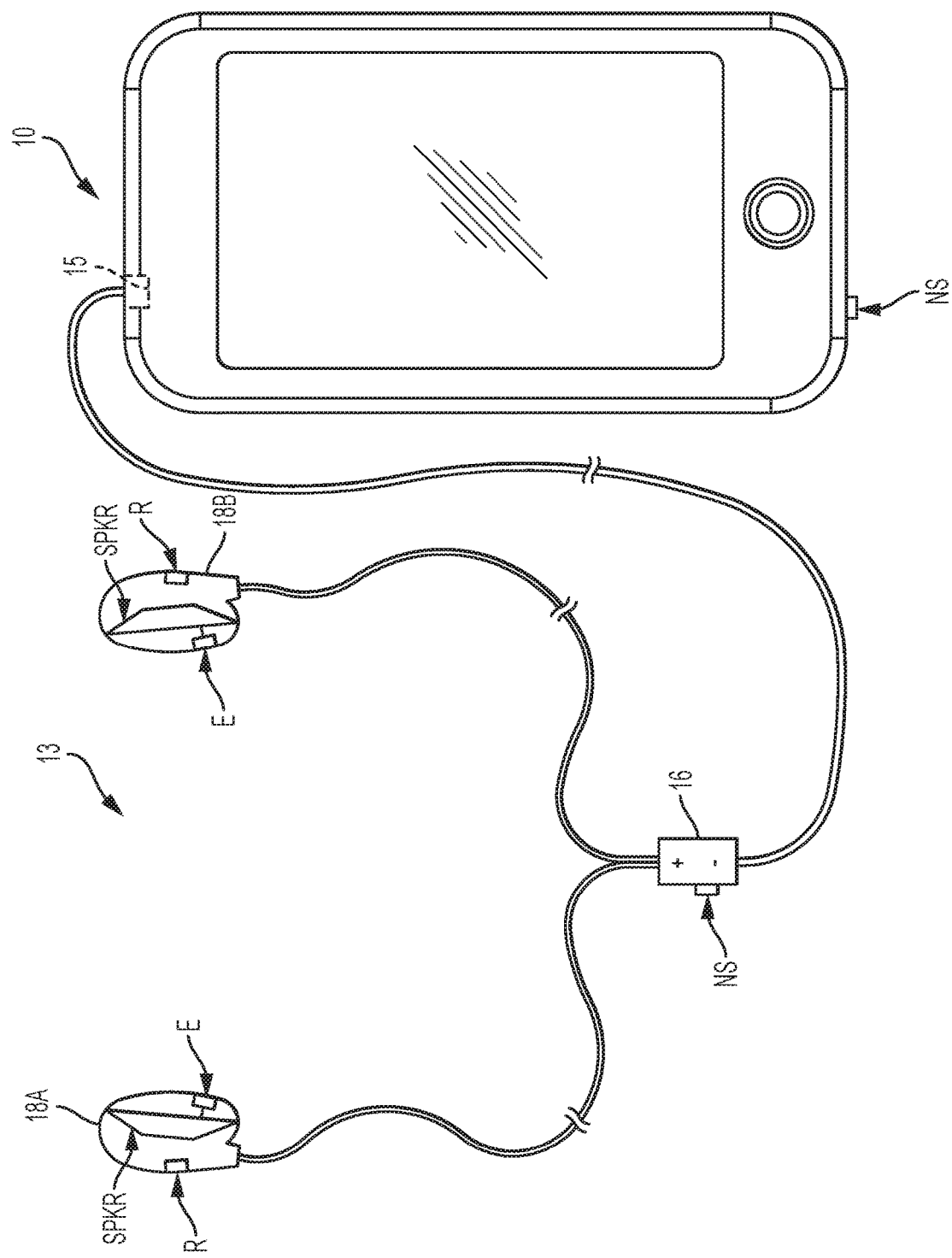
FIG. 1B is an illustration of an example wireless mobile telephone with a headphone assembly coupled thereto in accordance with embodiments of the present disclosure.

FIG. 1B is an illustration of an example wireless mobile telephone with a headphone assembly coupled thereto in accordance with embodiments of the present disclosure. In FIG. 1B, wireless telephone 10 is depicted having a headphone assembly 13 coupled to it via audio port 15. Audio port 15 may be communicatively coupled to RF integrated circuit 12 and/or CODEC IC 20, thus permitting communication between components of headphone assembly 13 and one or more of RF integrated circuit 12 and/or CODEC IC 20. As shown in FIG. 1B, headphone assembly 13 may include a combox 16, a left headphone 18A, and a right headphone 18B. As used in this disclosure, the term "headphone" broadly includes any loudspeaker and structure associated therewith that is intended to be mechanically held in place proximate to a listener's ear canal, and includes without limitation earphones, earbuds, and other similar devices. As more specific examples, "headphone," may refer to intra-concha earphones, supra-concha earphones, and supra-aural earphones.

Combox 16 or another portion of headphone assembly 13 may have a near-speech microphone NS that may capture near-end speech in addition to or in lieu of near-speech microphone NS of wireless telephone 10. In addition, each headphone 18A, 18B may include a transducer, such as speaker SPKR, that reproduces distant speech received by wireless telephone 10, along with other local audio events such as ringtones, stored audio program material, injection of near-end speech (i.e., the speech of the user of wireless telephone 10) to provide a balanced conversational perception, and other audio that requires reproduction by wireless telephone 10, such as sources from webpages or other network communications received by wireless telephone 10 and audio indications, such as a low battery indication and other system event notifications. Each headphone 18A, 18B may include a reference microphone R for measuring the ambient acoustic environment and an error microphone E for measuring of the ambient audio combined with the audio reproduced by speaker SPKR close to a listener's ear when such headphone 18A, 18B is engaged with the listener's ear. In some embodiments, CODEC IC 20 may receive the signals from reference microphone R, near-speech microphone NS, and error microphone E of each headphone and perform adaptive noise cancellation for each headphone as described herein. In other embodiments, a CODEC IC or another circuit may be present within headphone assembly 13, communicatively coupled to reference microphone R, near-speech microphone NS, and error microphone E, and configured to perform adaptive noise cancellation as described herein.

Figure 1C:
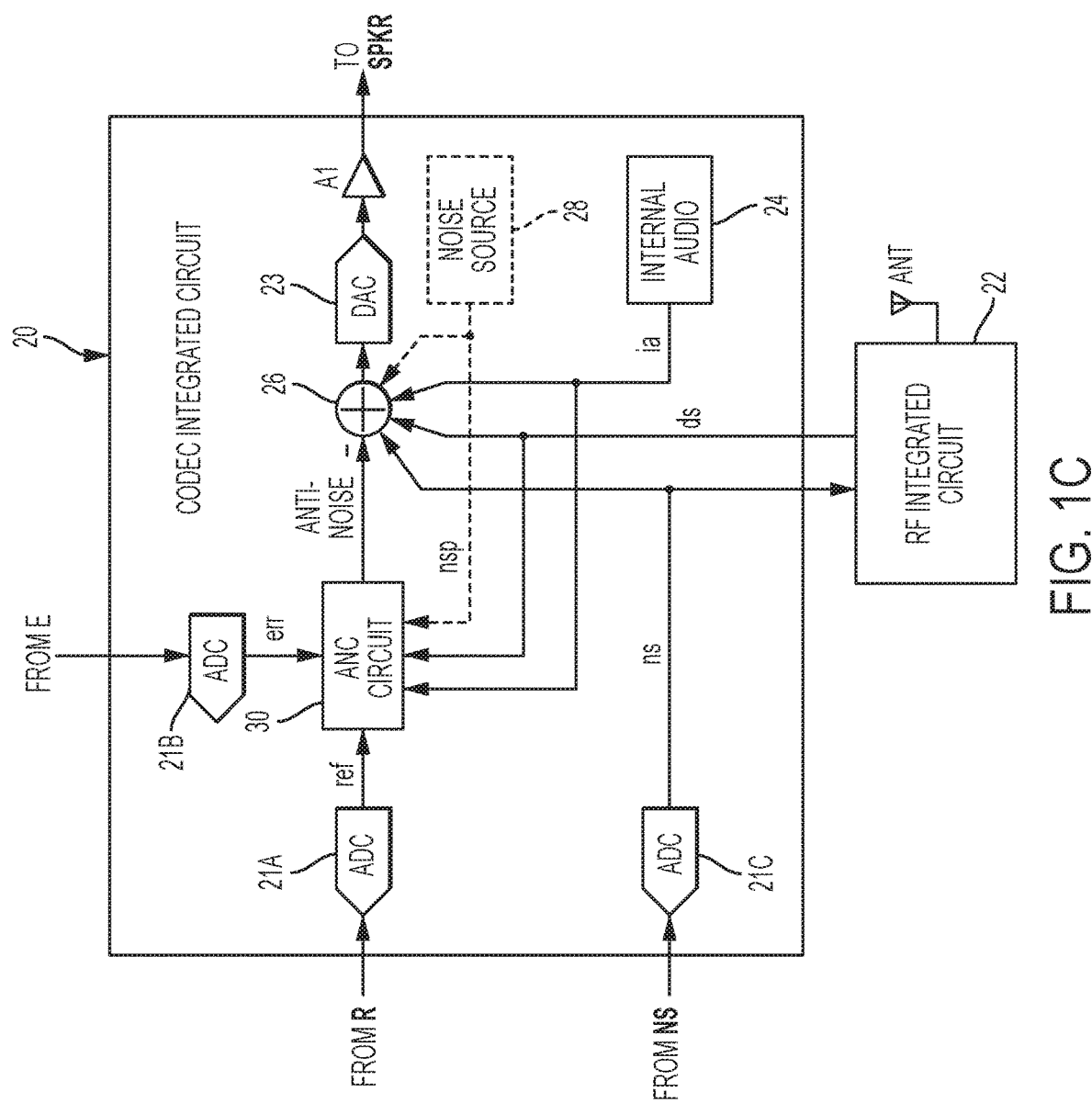
FIG. 1C is a block diagram of selected circuits within the wireless telephone depicted in FIG. 1A in accordance with embodiments of the present disclosure.

FIG. 1C is a block diagram of selected circuits within the wireless telephone depicted in FIG. 1A in accordance with embodiments of the present disclosure. In FIG. 1C, selected circuits within wireless telephone 10 are shown in a block diagram. CODEC IC 20 may include an analog-to-digital converter (ADC) 21A for receiving the reference microphone signal and generating a digital representation ref of the reference microphone signal, an ADC 21B for receiving the error microphone signal and generating a digital representation err of the error microphone signal, and an ADC 21C for receiving the near speech microphone signal and generating a digital representation ns of the near speech microphone signal. CODEC IC 20 may generate an output for driving speaker SPKR from an amplifier A1, which may amplify the output of a digital-to-analog converter (DAC) 23 that receives the output of a combiner 26. Combiner 26 may combine audio signals that is from internal audio sources 24, the anti-noise signal generated by ANC circuit 30, which by convention has the same polarity as the noise in reference microphone signal ref and is therefore subtracted by combiner 26, and a portion of near speech microphone signal ns so that the user of wireless telephone 10 may hear his or her own voice in proper relation to downlink speech ds, which may be received from radio frequency (RF) integrated circuit 22 and may also be combined by combiner 26. Near speech microphone signal ns may also be provided to RF integrated circuit 22 and may be transmitted as uplink speech to the service provider via antenna ANT. In some embodiments, combiner 26 may also combine a substantially inaudible noise signal nsp (e.g., a noise signal with low magnitude and/or in frequency ranges outside the audible band) generated from a noise source 28.

Figure 1D:
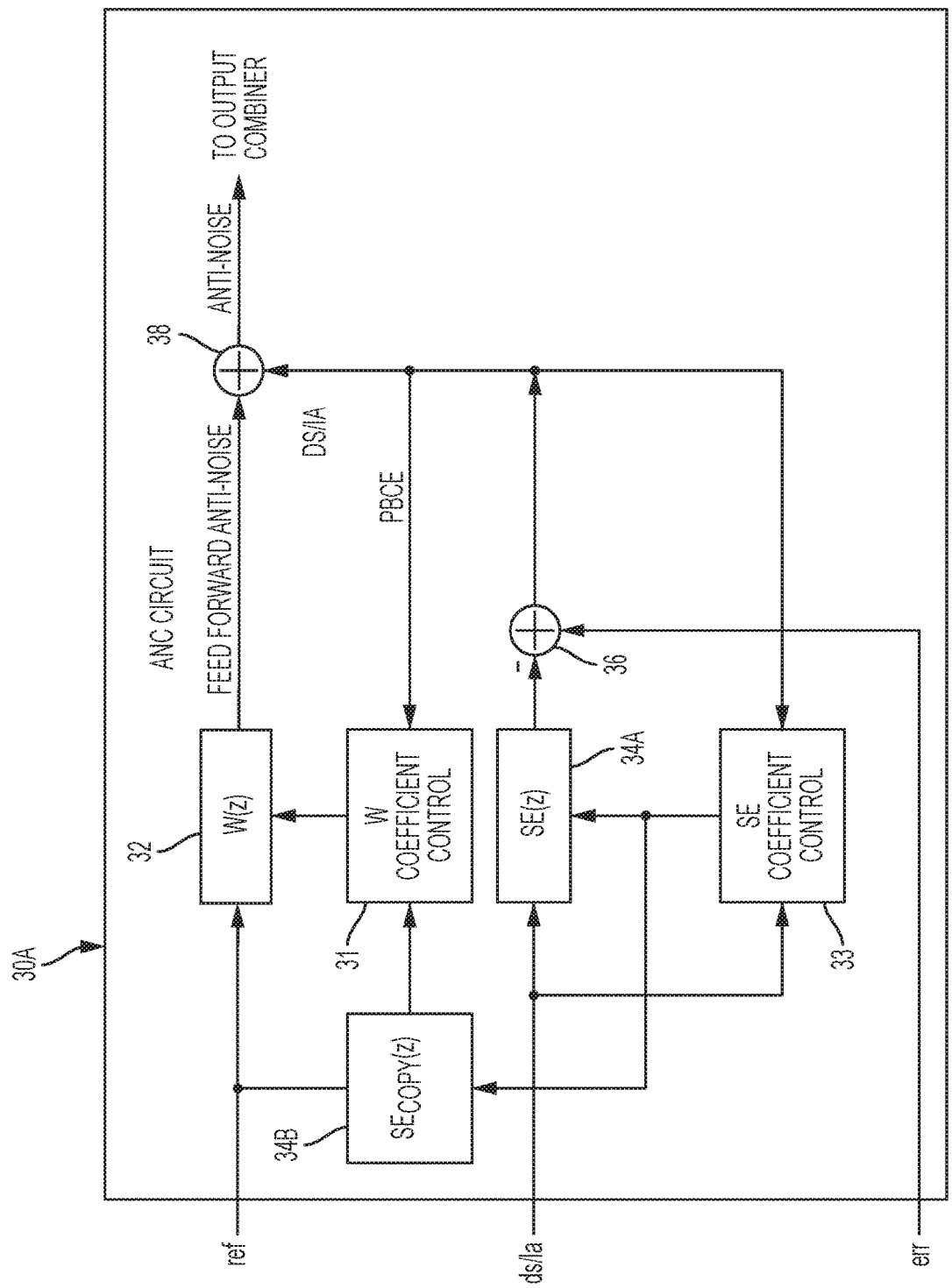
FIG. 1D is a block diagram depicting selected signal processing circuits and functional blocks within an example adaptive noise canceling (ANC) circuit of a coder-decoder (CODEC) integrated circuit of FIG. 1C in accordance with embodiments of the present disclosure.

FIG. 1D is a block diagram depicting selected signal processing circuits and functional blocks within an example active noise canceling (ANC) circuit of a coder-decoder (CODEC) integrated circuit of FIG. 1C in accordance with embodiments of the present disclosure. In FIG. 1D, details of ANC circuit 30A are shown in accordance with embodiments of the present disclosure. ANC circuit 30A may be used in some embodiments to implement ANC circuit 30 depicted in FIG. 1C. As shown in FIG. 1D, adaptive filter 32 may receive reference microphone signal ref and under ideal circumstances, may adapt its transfer function W(z) to be P(z)/S(z) to generate a feedforward anti-noise component of the anti-noise signal, which may be combined by combiner 38 with the source audio signal to be reproduced by the transducer, as exemplified by combiner 26 of FIG. 1C. The coefficients of adaptive filter 32 may be controlled by a W coefficient control block 31 that uses a correlation of signals to determine the response of adaptive filter 32, which generally minimizes the error, in a least-mean squares sense, between those components of reference microphone signal ref present in error microphone signal err. The signals compared by W coefficient control block 31 may be the reference microphone signal ref as shaped by a copy of an estimate of the response of path S(z) provided by filter 34B and another signal that includes error microphone signal err. By transforming reference microphone signal ref with a copy of the estimate of the response of path S(z), response $SE_{COPY}(z)$, and minimizing the ambient audio sounds in the error microphone signal, adaptive filter 32 may adapt to the desired response of P(z)/S(z). In addition to error microphone signal err, the signal compared to the output of filter 34B by W coefficient control block 31 may include an inverted amount of downlink audio signal ds and/or internal audio signal ia that has been processed by filter response SE(z), of which response $SE_{COPY}(z)$ is a copy. By injecting an inverted amount of downlink audio signal ds and/or internal audio signal ia, adaptive filter 32 may be prevented from adapting to the relatively large amount of downlink audio and/or internal audio signal present in error microphone signal err. However, by transforming that inverted copy of downlink audio signal ds and/or internal audio signal ia with the estimate of the response of path S(z), the downlink audio and/or internal audio that is removed from error microphone signal err should match the expected version of downlink audio signal ds and/or internal audio signal ia reproduced at error microphone signal err, because the electrical and acoustical path of S(z) is the path taken by downlink audio signal ds and/or internal audio signal ia to arrive at error microphone E. Filter 34B may not be an adaptive filter, per se, but may have an adjustable response that is tuned to match the response of adaptive filter 34A, so that the response of filter 34B tracks the adapting of adaptive filter 34A.

To implement the above, adaptive filter 34A may have coefficients controlled by SE coefficient control block 33, which may compare downlink audio signal ds and/or internal audio signal ia and error microphone signal err after removal of the above-described filtered downlink audio signal ds and/or internal audio signal ia, that has been filtered by adaptive filter 34A to represent the expected downlink audio delivered to error microphone E, and which is removed from the output of adaptive filter 34A by a combiner 36 to generate a playback-corrected error (shown as PBCE in FIG. 1D). SE coefficient control block 33 may correlate the actual downlink speech signal ds and/or internal audio signal ia with the components of downlink audio signal ds and/or internal audio signal ia that are present in error microphone signal err. Adaptive filter 34A may thereby be adapted to generate a signal from downlink audio signal ds and/or internal audio signal ia, that when subtracted from error microphone signal err, contains the content of error microphone signal err that is not due to downlink audio signal ds and/or internal audio signal ia.

In some embodiments, ANC system 30A may be configured to receive an input signal for reproduction through a transducer (e.g., a speaker). The input signal may include downlink audio signal ds and/or internal audio signal ia. As illustrated in FIG. 1D, ANC system 30A may also be configured to receive a reference signal ref. In some embodiments, reference signal ref may be received from a reference microphone coupled to ANC system 30A. Furthermore, ANC system 30A may also be configured to receive an error signal err. In some embodiments, error signal err may be received from an error microphone coupled to ANC system 30A.

Figure 2A:
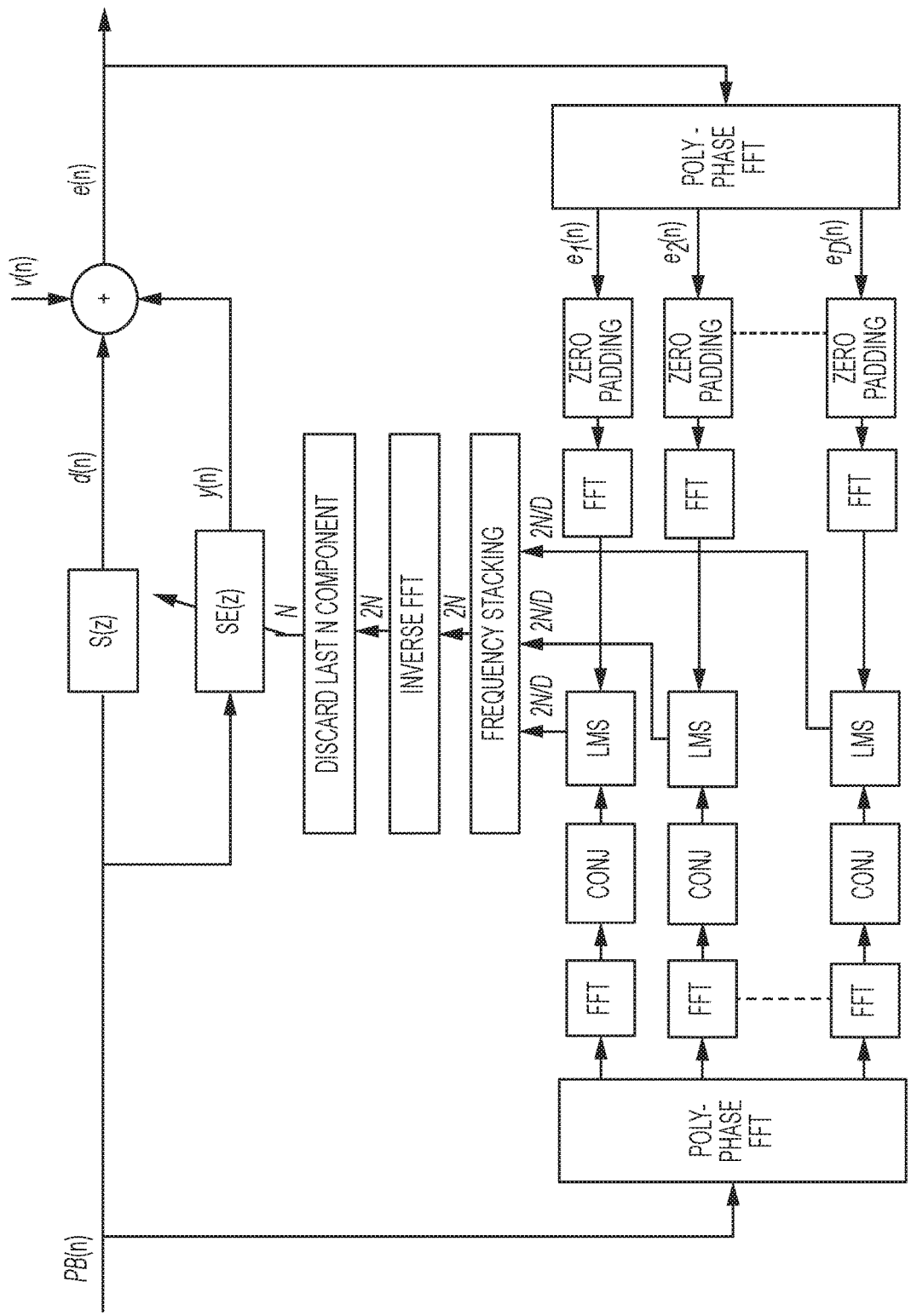
FIGS. 2A-C are schematic block diagrams illustrating other embodiments of an ANC system illustrated in FIG. 1D according to some embodiments of the disclosure.
Figure 2B:
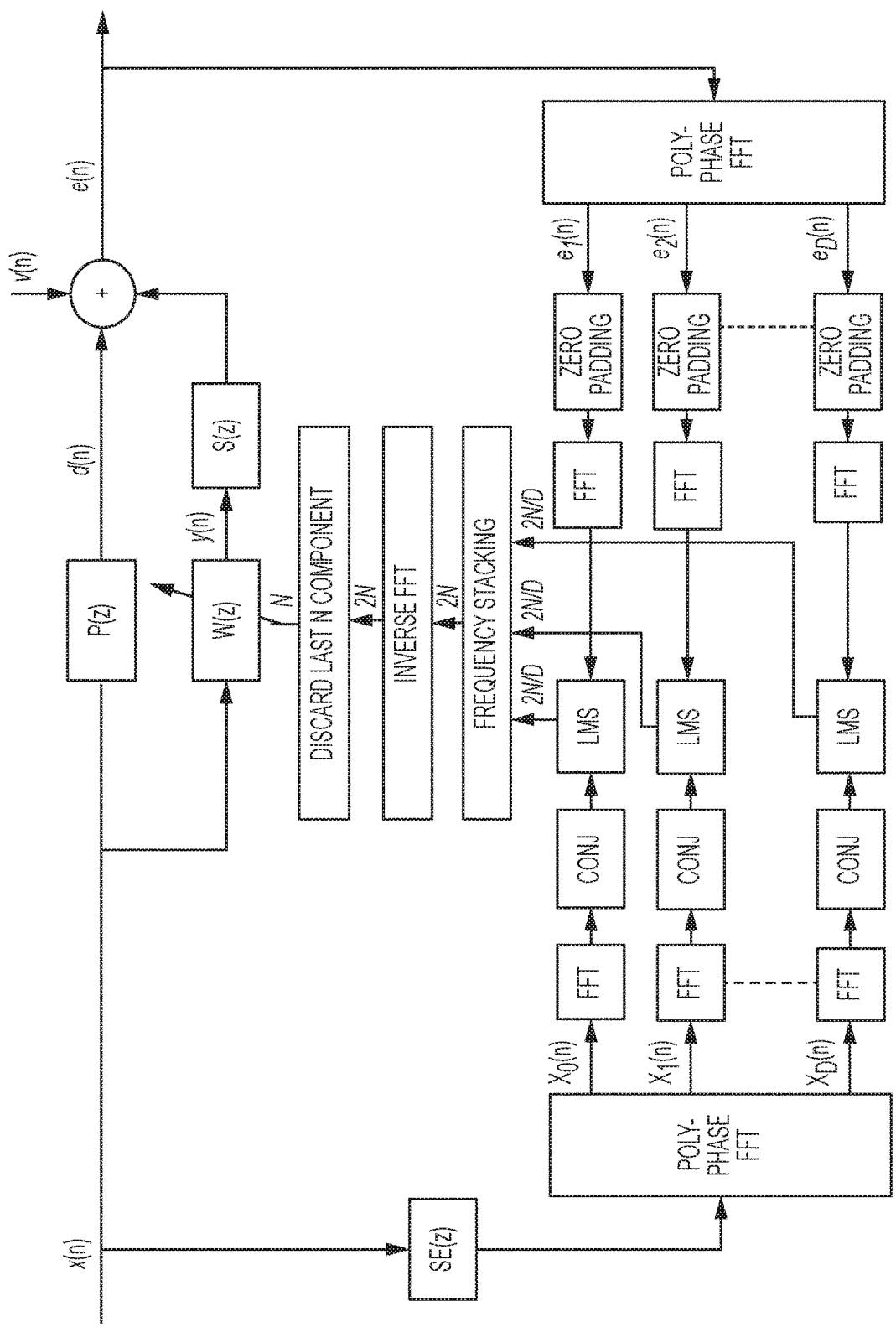
Figure 2C:
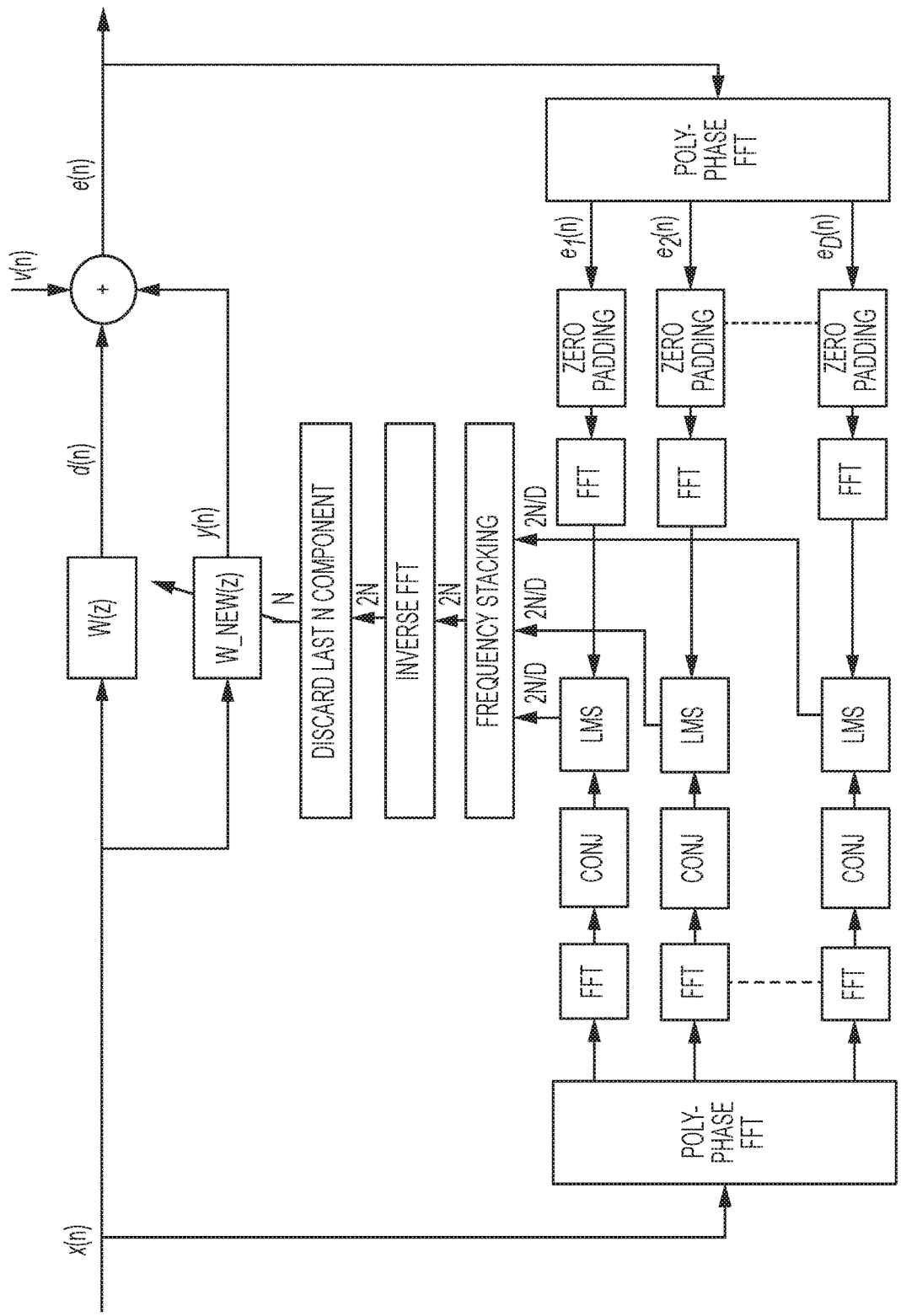

FIGS. 2A-C provide example schematic block diagrams illustrating other embodiments of the ANC system 30A illustrated in FIG. 1D according to embodiments of the disclosure. For example, FIG. 2A represents the SE coefficient control blocks 33 and 34A in FIG. 1D, and FIG. 2B represents the W coefficient control blocks 31 and 32 in FIG. 1D. FIG. 2C illustrates another embodiment for W coefficient processing, as in FIG. 2B, but with a processing arrangement similar to FIG. 2A. For example, FIG. 2C includes W(z) and W_new(x) blocks for generating d(n) and y(n) signals, respectively, similar to the S(z) and SE(z) blocks for generating d(n) and y(n) signals, respectively, of FIG. 2A. One of skill in the art understands that the operation of ANC system 30A may be represented in various other ways in addition to those illustrated in FIGS. 2A-C and that the diagrams illustrated in FIGS. 2A-C are provided only as examples to illustrate some of the operational blocks that may be used to implement embodiments of this disclosure.

Figure 3:
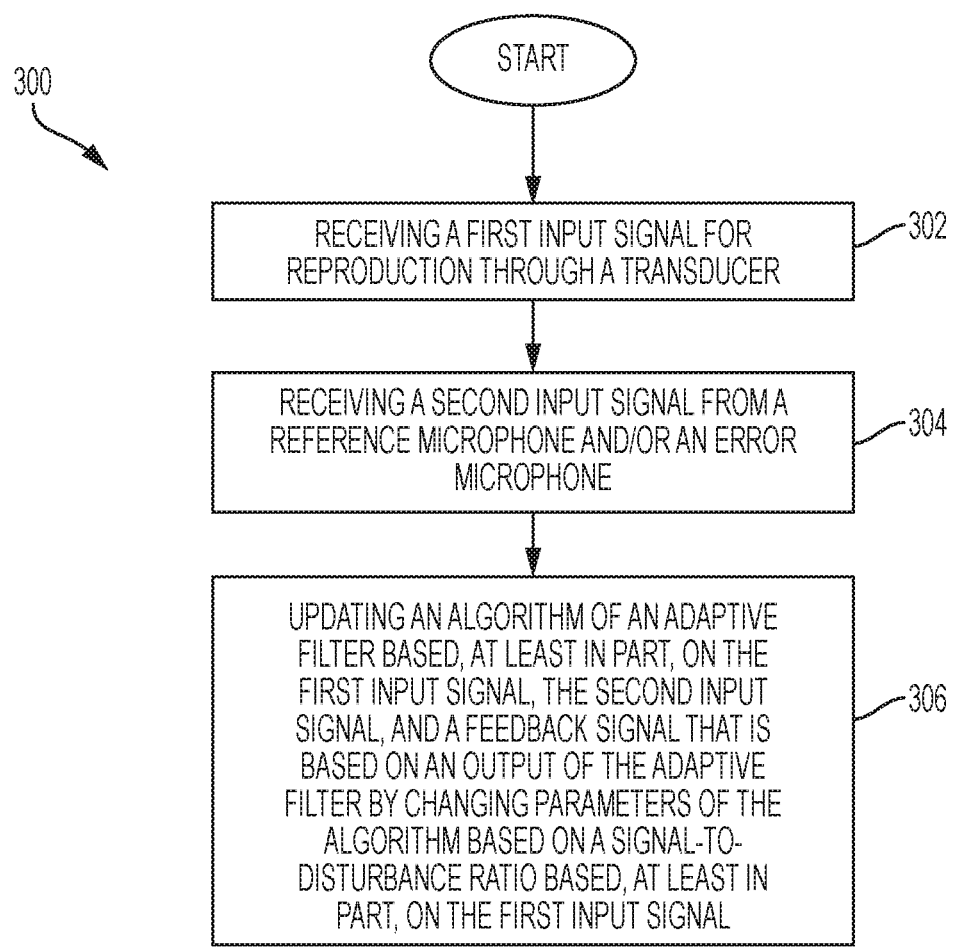
FIG. 3 is a flow chart illustrating an example method for performing frequency-domain updating of an ANC system according to one embodiment of the disclosure.

FIG. 3 is a flow chart illustrating an example method for performing frequency-domain updating of an ANC system 100 according to some embodiments of the disclosure. Method 300 may be implemented with the systems described with respect to FIGS. 1-2 or other systems. Method 300 begins, at block 302, with receiving a first input signal for reproduction through a transducer. In some embodiments, the first input signal may include downlink audio signal ds and/or internal audio signal ia. At block 304, method 300 includes receiving a second input signal from a reference microphone and/or an error microphone. In some embodiments, the second input signal may be reference signal ref received from a reference microphone coupled to ANC system 30A and/or an error signal ref received from an error microphone coupled to ANC system 30A.

At block 306, method 300 includes updating an algorithm of an adaptive filter based, at least in part, on the first input signal, the second input signal, and a feedback signal that is based on an output of the adaptive filter by changing parameters of the algorithm based on a signal-to-disturbance ratio (SDR) based, at least in part, on the first input signal. In some embodiments, the step of changing parameters of the algorithm may include changing at least one of coefficients, step size, leakage, and frequency-domain bins. In embodiments that change the step size, the step size may be adjusted based, at least in part, on a ratio of an amplitude of the first input signal to an amplitude of a disturbance on the second input signal. The ratio is one example of a signal-to-disturbance ratio (SDR). The step size for updating the algorithm of the adaptive filter may be based, at least in part, on the SDR or another parameter related to the SDR.

The step of block 306 for updating the algorithm may include updating an algorithm for a secondary path estimate (SE). In some embodiments, the SE may be represented in the frequency domain as SE(z), as illustrated in FIGS. 1D and 2A. In certain embodiments, processing performed by the SE block may be represented by the following equation:

$$SE=(1-\mu\lambda)SE(n)+\mu pb(n)e(n). \quad (1)$$

In equation (1), $\mu$ may represent the step size for updates to equation (1), $\lambda$ may represent signal leakage, pb(n) may represent an audio signal to be played back to a user (e.g., x(n)), and e(n) may represent an error or reference signal. In some embodiments, playback signal pb(n) may correspond to, or be determined from, the first input signal, and e(n) may correspond to, or be determined from, the second input signal.

In certain embodiments, the step, at block 306, of updating the algorithm of the adaptive filter may also include calculating a set of updating coefficients $SE_m^f$ for the SE provided in equation (1) based on at least one of the following frequency-domain updating equations:

$$SE_m^f(n+1) = (1 - \mu_m^f \lambda_m^f)SE_m^f(n) + \mu_m^f pb_m^f(n)e_m^f(n) \quad (2b)$$

$$SE_m^f(n+1) = (1 - \mu_m^f \lambda_m^f)SE_m^f(n) + \mu_m^f[S_m^f(n) - SE_m^f(n)] + \mu_m^f \frac{v_m^f(n)}{pb_m^f(n)}.$$

In equation (2a), $e_m^f$ can be represented by the sum of actual error caused by the difference S(z) and SE(z), and disturbance signal $v_m^f$. Therefore, equation (2a) can be represented as equation (2b), and $S_m^f$ may correspond to, or be determined from, the first input signal. According to an embodiment, disturbance signal $v_m^f$ may be determined from the second input signal, e.g., the reference signal and/or error microphone signal. In some embodiments, for SE adaptation control, the SDR may be a function of the inverse of the ratio $$\frac{v_m^f(n)}{pb_m^f(n)}.$$

The ratio $$\frac{v_m^f(n)}{pb_m^f(n)},$$

which is a ratio of the disturbance to the playback signal, may be determined from the first input signal and the second input signal. If the second input signal is the error signal, the disturbance can be estimated by tracking the error signal power using a fast tracking parameter and a slow tracking parameter. For example, ANC system 30A may determine the ratio periodically or non-periodically at the occurrence of specified events.

According to some embodiments, the subscript/superscript $_m^f$ may signify that the parameter corresponds to a distinct frequency bin m. In other words, a parameter with subscript m represents that the value for that parameter is the value for that parameter at frequency bin m. Accordingly, as shown in equation (2), updates for the adaptive filtering algorithm shown in equation (2) may be determined on a per-frequency-bin basis such that every frequency bin is distinctly updated according to equation (2). Stated differently, an adaptive filtering block of ANC system 30A may generate an ANC signal in the frequency domain such that the step of updating the algorithm of the adaptive filter may include processing in the frequency domain. Similarly, the SDR and the ratio of the disturbance to the playback signal may be determined for each frequency bin. Therefore, processing in the ANC system may also include estimating a SDR for a frequency bin.

In some embodiments, $\mu$, the step size for updating the algorithm of an adaptive filtering block, may be determined based, at least in part, on the SDR. Similarly, $\mu$ may be determined based, at least in part, on the ratio $$\frac{v_m^f(n)}{pb_m^f(n)}$$

because the ratio $$\frac{v_m^f(n)}{pb_m^f(n)}$$

has an inverse relationship with the SDR. For example, ANC system 30A may be configured to adapt $\mu$ to be inversely related to the ratio $$\frac{v_m^f(n)}{pb_m^f(n)}.$$

In some embodiments, when the disturbance signal $v_m^f$ increases, the step size $\mu$ may be decreased by ANC system 30A so that the step size is small when the disturbance signal is large. Similarly, the step size may be increased by ANC system 30A when the disturbance signal decreases so that the step size is large when the disturbance signal is small. In other words, the step size may be increased by ANC system 30A for a small disturbance, and the step size may be decreased by ANC system 30A for a large disturbance. The step size may be held nearly constant or may be set to zero to prevent the algorithm from updating to a new value when the disturbance exceeds a threshold value. In other words, the adaptive filter may be held nearly constant when the SDR falls below a threshold value. In some embodiments, the value of the step size $\mu$ may range from a minimum of 0 to a maximum of 1. In addition, in certain embodiments, ANC system 30A may vary the step size $\mu$ periodically based on the periodic measurements of the disturbance to playback ratio.

Updating the algorithm of an adaptive filtering block with a variable step size as disclosed herein may result in many advantages for the ANC system 30A of this disclosure over traditional ANC systems. In particular, the inverse adaptation of the algorithm-updating step size with respect to the disturbance may have the advantageous effects of reducing the impact of disturbances on the signal that is reproduced through a transducer while also improving the convergence of the adaptation algorithm. For example, a disturbance signal may reduce the ability of an ANC system to converge because the disturbance causes the algorithm updates to move in a direction that does not correspond to the direction of optimal convergence. By making the step size small when the disturbance is large, the divergent impact of the disturbance may be reduced because the algorithm update may not move significantly away from the direction of optimal convergence because the update step size is small. Similarly, by making the step size large when the disturbance is small, the algorithm may converge faster. In other words, the variable step size controlling of the updating algorithm allows the algorithm to take large steps towards convergence when the divergent impact of the disturbance is low and to take small steps away from convergence when the divergent impact of the disturbance is high.

Equation (2) is a frequency-domain updating algorithm for SE where the step size can be a variable step size that is varied by the ANC system 30A to counteract the impact of disturbance signals. A similar algorithm may be employed in the time domain. That is, in certain embodiments, the step, at block 306, of updating the algorithm of the adaptive filter may also include calculating a set of updating coefficients for the SE provided in equation (1) based on the following time-domain updating equation:

$$SE_m^f(n+1) = (1 - \mu_m^f \lambda_m^f) SE_m^f(n) + \mu_m^f p b_m^f(n) e_m^f(n). \quad (3)$$

Equation (3) is a time-domain updating algorithm for SE where the step size can be a variable step size that is varied by the ANC system 30A to counteract the impact of disturbance signals.

A similar concept can also be extended to the W(z) coefficient control block 31 in FIG. 1D. As a result, ANC system 30A may also be configured to generate an output signal for output to the transducer based on the SDR-based stepsize control. In some embodiments, the generated output signal may include a combination of the first input signal and the ANC signal output by the adaptive filtering block. In certain embodiments, an adaptive filtering block of ANC system 30A may implement the frequency-domain updating algorithm provided in equation (2) to update the $SE_m^f$ coefficients, or a modified equation of (2) to update the $W_m^f$ coefficients. In another embodiment, an adaptive filtering block of ANC system 30A may implement the time-domain updating algorithms provided in equation (3) to update the SE coefficients, or a modified equation of (3) to update W.

Figure 4:
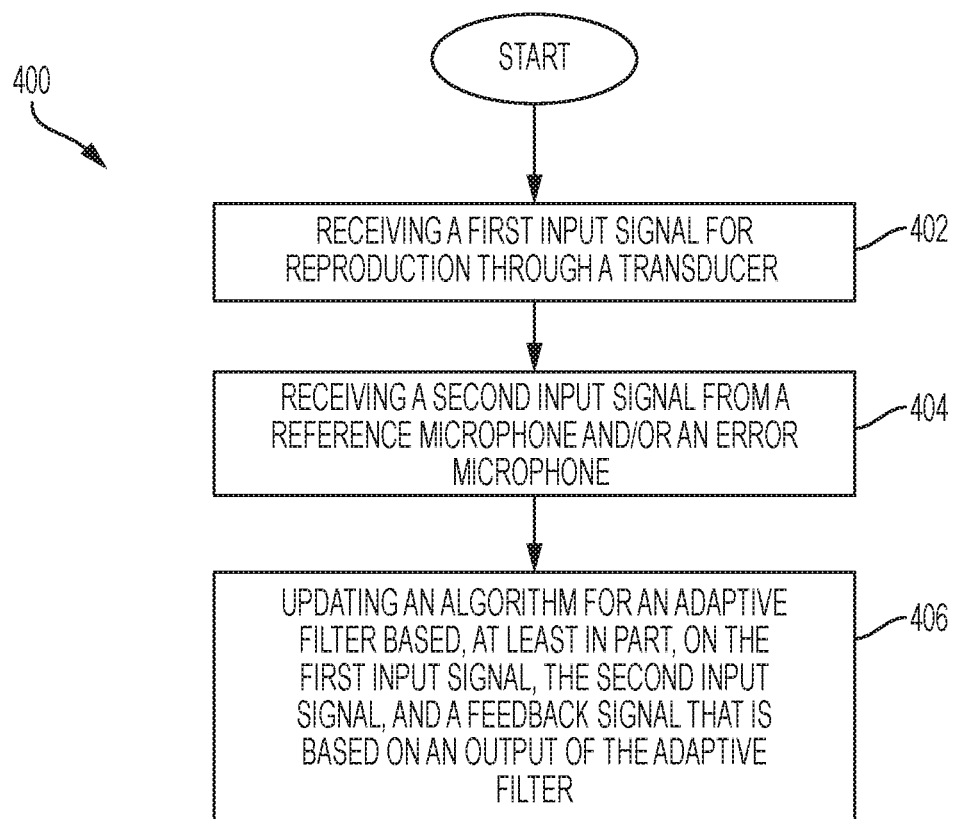
FIG. 4 is a flow chart illustrating an example method for performing normalized frequency-domain updating of an ANC system according to one embodiment of the disclosure.

The control of updating an ANC system may also be improved in other ways in addition to, or as an alternative to, the variable step size control described with respect to FIG. 3. For example, FIG. 4 is a flow chart illustrating an example method for performing normalized frequency-domain updating of an ANC system according to some embodiments of the disclosure. Method 400 may be implemented with the systems described with respect to FIGS. 1-2 or other systems. Method 400 begins, at block 402, with receiving a first input signal for reproduction through a transducer. At block 404, method 400 includes receiving a second input signal from a reference microphone and/or an error microphone. In some embodiments, the first input signal and the second input signal may correspond to, or be similar to, the first input signal and the second input signal described with respect to method 300, respectively. At block 406, method 400 includes updating an algorithm for an adaptive filter based, at least in part, on the first input signal, the second input signal, and a feedback signal that is based on an output of the adaptive filter by normalizing a step size of the adaptive filter algorithm and/or processing at least full band information for the input signal in a frequency domain to generate coefficient values for the algorithm. According to an embodiment, the adaptive filter may be an adaptive filtering block of ANC system 30A.

In some embodiments, block 406 may include updating W(z) in the frequency domain using full-band information for step size normalization. Examples of ANC systems with frequency-domain adaptations are illustrated in FIGS. 1D, 2C, and 2D. Accordingly, in some embodiments, the step, at block 406, of updating the adaptive filter coefficients $w_m^f$ for transfer function W(z) may be based on the following frequency-domain updating algorithm:

$$W_m^f(n+1) = (1 - \mu_m \lambda_m) W_m^f(n) + \mu_m \frac{x_m^{f*}(n) e_m^f(n)}{|x_m^f(n)||x_m^f(n)|_{max}}. \quad (4)$$

In equation (4), $\mu_m$ may represent the step size for frequency bin m for updates to equation (4), $\lambda_m$ may represent signal leakage in frequency bin m, $x_m^f(n)$ may represent an input signal from the reference microphone, and $e_m^f(n)$ may represent an error signal from error microphone feedback signal. $|x_m^f(n)|_{max}$ may be the maximum magnitude of full-band $x_m^f(n)$. $|x_m^f(n)|$ may be the signal magnitude at frequency bin m.

In some embodiments, block 406 may include processing full band information for the input signal in a frequency domain to generate coefficient values for the algorithm, as shown in equation (4). In some embodiments, the full band information for the input signal may include a full band average power or maximum power for the input signal. For example, in equation (4), the maximum power of all frequency bins corresponds to the denominator parameter $|x_m^f(n)|_{max}$.

According to one embodiment, the step of normalizing the step size may also include normalizing the step size based, at least in part, on the second input signal, such as the signal from the reference microphone. In another embodiment, the step of normalizing the step size may also include normalizing the step size based, at least in part, on a maximum magnitude of full band information of the second input signal. In yet another embodiment, the step of normalizing the step size may also include normalizing the step size based, at least in part, on full-band information of the second input signal. According to another embodiment, the step size may be normalized using at least full band information in each frequency bin.

Magnitude constraints may be applied to further improve the control of the updating of an ANC system. For example, magnitude constraints may be applied to improve ANC spectrum performance and to prevent adverse impacts from noise boosting and filter divergence. To implement the magnitude constraints, in some embodiments, the step of updating the algorithm for the adaptive filter may include applying magnitude constraints at individual frequency bins. As one specific example with reference to equation (4), the step, at block 406, of updating the algorithm of the adaptive filter may include calculating a set of updating coefficients $W_m^f$ for transfer function W(z) based on the following frequency-domain updating equation that implements magnitude constraints:

$$w_m^f(n+1) = \begin{cases} w_m^f(n) + \mu_m \frac{x_m^{f*}(n) e_m^f(n)}{|x_m^f(n)||x_m^f(n)|_{max}} & |w_m^f(n)| < limiter_m^f \\ (1 - \lambda_m) w_m^f(n) & |w_m^f(n)| > limiter_m^f \end{cases} \quad (5)$$

In another specific example with reference to equation (4), block 406 may include calculating a set of updating coefficients $W_m^f$ for transfer function W(z) based on the following frequency-domain updating equation that implements magnitude constraints:

$$w_m^f(n+1) = \begin{cases} w_m^f(n+1) & |w_m^f(n+1)| < limiter_m^f \\ \dfrac{w_m^f(n+1)}{|w_m^f(n-1)|} limiter_m^f & |w_m^f(n-1)| > limiter_m^f \end{cases} \quad (6)$$

Figure 8:
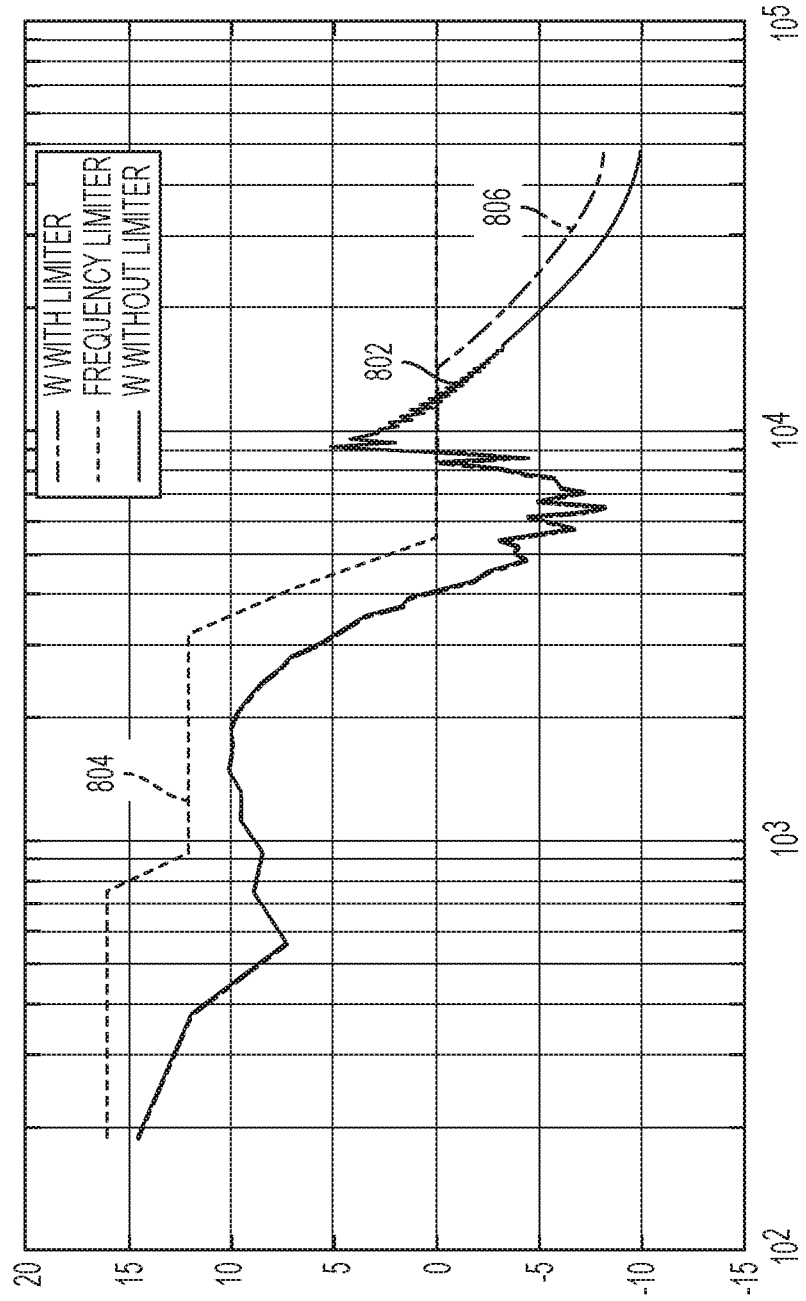
FIG. 8 is a graph illustrating example ANC system operation with gain limiting according to some embodiments of the disclosure.

An ANC system that implements a frequency-domain updating algorithm that implements magnitude constraints, such as those provided in equations (5) and (6), may have its frequency domain magnitude response constrained at individual frequency bins. According to some embodiments, the constraints on the magnitudes provided in equations (5) and (6) may be adjusted automatically based on the magnitude of the S(z) response. For example, the constraint on W(z) magnitude could be adjusted automatically based on the magnitude of the S(z) response. In some embodiments, the phase response of the updating algorithm may continue updating even when the magnitude is constrained. According to one embodiment, the magnitude constraints may be user defined. In another embodiment, the magnitude constraints may be adjusted based on response of an electroacoustic path S(z). For example, as the overall gain of S(z) increases, the magnitude constraints can be lowered so that there is a small magnitude constraint when the input signal has an overall large gain. Similarly, as the overall gain of S(z) decreases, the magnitude constraints can be raised so that there is a large magnitude constraint when the input signal has an overall small gain. Through such adaptation of the magnitude constraints, performance variance between users of personal devices may be reduced. FIG. 8 is a graph illustrating example adaptive noise cancellation (ANC) system operation with magnitude constraints according to some embodiments of the disclosure. Line 802 illustrates an ANC output signal without magnitude constraints. Line 804 shows an example magnitude constraint to be applied by an adaptive filter algorithm. Line 806 illustrates an ANC output signal with the magnitude constraints of line 804 applied according to some embodiments of the invention.

ANC system 30A may also be configured to generate an output signal for output to the transducer based on an ANC signal that is determined based on any of the embodiments disclosed herein. According to some embodiments, the generated output signal may include a combination of the first input signal and the ANC signal output by the adaptive filtering block. For example, in certain embodiments, an adaptive filtering block of ANC system 30A may implement the frequency-domain updating algorithm provided in equation (2) to update the $SE_m^f$ coefficients. In another embodiment, an adaptive filtering block of ANC system 30A may implement the time-domain updating algorithm provided in equation (3) to update the $SE_m^f$ coefficients. In yet another embodiment, an adaptive filtering block of ANC system 30A may implement the frequency-domain updating algorithm provided in equation (4) to update the $W_m^f$ coefficients. In another embodiment, an adaptive filtering block of an ANC system 30A may implement the frequency-domain updating algorithm provided in equation (5) or equation (6) where magnitude constraints are also used to update the $W_m^f$ coefficients.

An ANC system configured in accordance with any of the foregoing embodiments may be further configured to specifically handle various disturbances experienced by personal audio devices. Because of the advantages offered by the improved ANC systems that include the advanced updating algorithms disclosed herein, the ANC systems configured in accordance with any of the foregoing embodiments may also offer improved performance when handling various disturbances experienced by personal audio devices.

Figure 5:
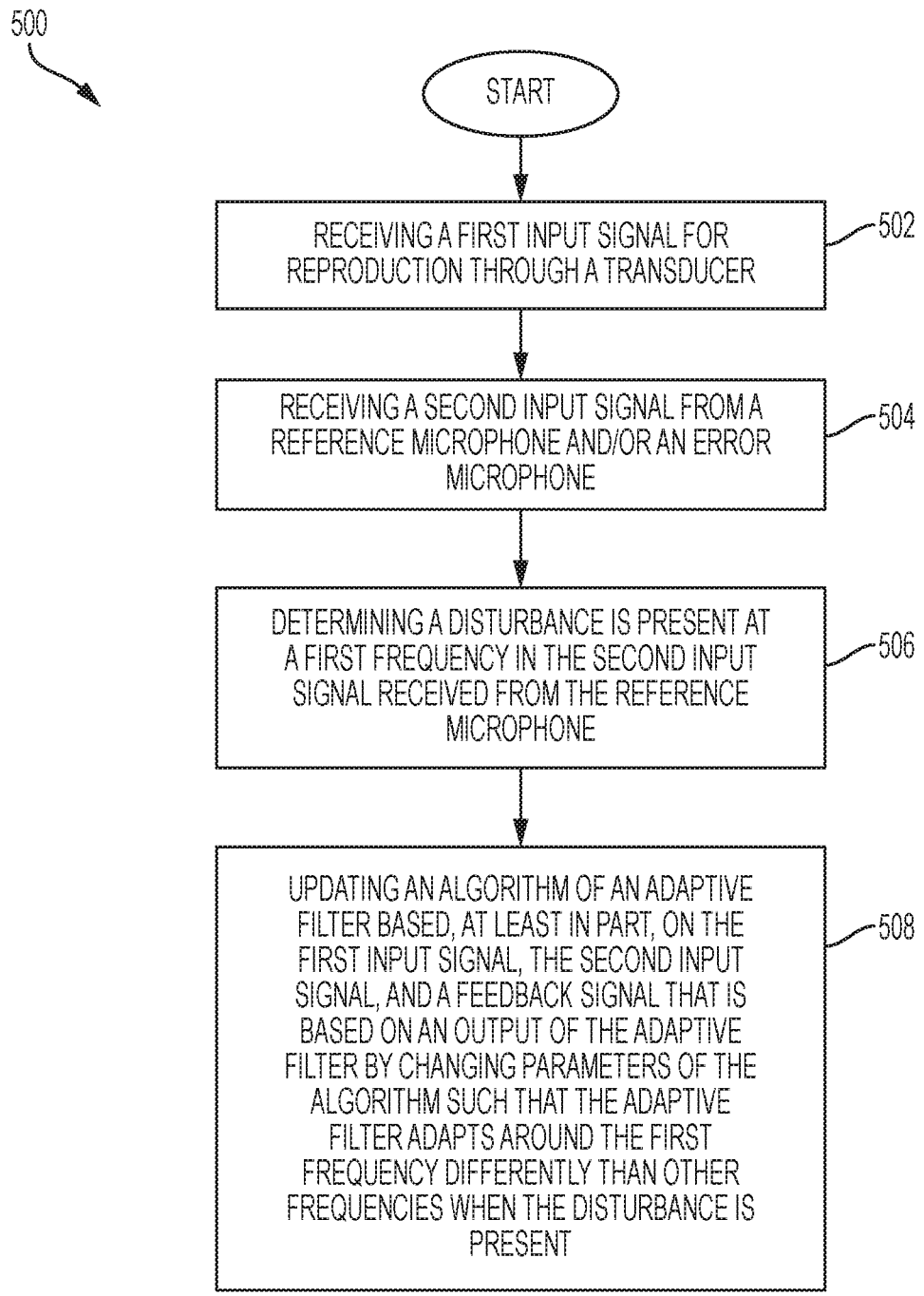
FIG. 5 is a flow chart illustrating an example method for handling disturbances with an ANC system according to one embodiment of the disclosure.

FIG. 5 is a flow chart illustrating an example method for handling disturbances with an ANC system according to some embodiments of the disclosure. Method 500 may be implemented with the systems described with respect to FIGS. 1-2 or other systems. Method 500 begins, at block 502, with receiving a first input signal for reproduction through a transducer. At block 504, method 500 includes receiving a second input signal from a reference microphone and/or an error microphone. In some embodiments, the first input signal and the second input signal may correspond to, or be similar to, the first input signal and the second input signal, respectively, described with respect to methods 300 and 400.

At block 506, method 500 includes determining if a disturbance is present at a first frequency in the second input signal received from the reference microphone and/or error microphone. In some embodiments, an ANC system may determine the disturbance periodically or non-periodically. When a disturbance is detected, the frequency bins corresponding to the disturbance may be identified.

At block 508, method 500 includes updating an algorithm by adjusting processing of frequencies at or near the disturbance. Block 508 may include updating an adaptive filter based, at least in part, on the first input signal, the second input signal, and a feedback signal that is based on an output of the adaptive filter by changing parameters of the algorithm such that the adaptive filter adapts around the first frequency differently than other frequencies when the disturbance is present. The algorithm of block 508 may correspond to, or be similar to, any of the ANC updating algorithms disclosed herein. According to an embodiment, block 508 may include updating the algorithm of the adaptive filter around the first frequency and a predetermined number of frequency bins around the first frequency. In another embodiment, block 508 may be performed in the frequency domain. According to one embodiment, the step of updating an algorithm of an adaptive filter may be performed in the time domain, such as through the use of a band-pass filter.

In some embodiments, adapting the filter around the first frequency where the disturbance is present differently than other frequencies may allow the ANC system to more sensitively detect disturbances and to handle such disturbances more robustly by not having to adapt the full band of audio information as drastic as is needed at the frequency where the significant disturbance is present. In other words, because the adaptation may be done on a per-frequency-bin basis, only those frequency bins that experience significant disturbances may require significant adaptation or cancellation while other frequency bins may be adapted or cancelled less drastically.

In some embodiments, the step of determining if the disturbance is present may include determining a presence of a new tone disturbance, and the step, at block 508, of updating the algorithm of the adaptive filter may include holding constant the adaptive filter at the first frequency. In particular, the new tone disturbance may be determined to exist at the first frequency or a frequency range that includes the first frequency. In some embodiments, the new tone disturbance may cause the SDR to approach zero or be near a zero value. In an embodiment where the step size of the updating algorithm may be varied based on the value of the disturbance, a near-zero SDR may result in the step size being set to be near zero. In some embodiments, when the step size is set to be near zero or is set to be zero, the step size may be frozen, i.e., not modified, to prevent the algorithm from updating to a new value. In other words, the algorithm of the adaptive filter may be held still when the SDR falls below a threshold value.

Figure 6:
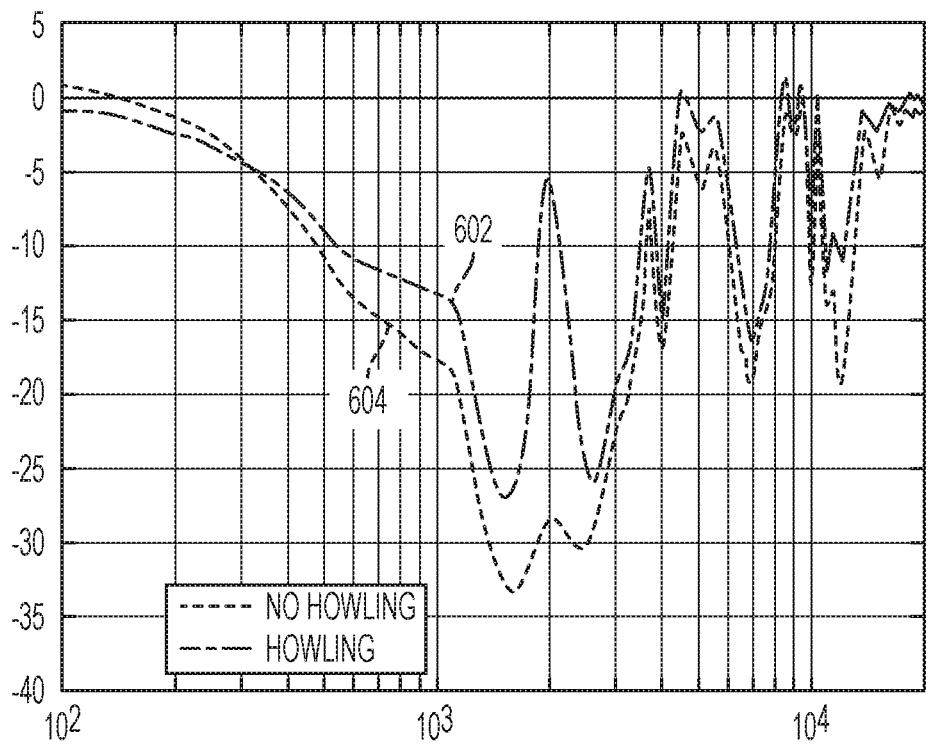
FIG. 6 is a graph illustrating example ANC system operation for removal of a howling disturbance according to some embodiments of the disclosure.

In another embodiment, the step of determining if the disturbance is present may include determining a presence of a howling action, and the step of updating the algorithm of the adaptive filter may include reducing anti-noise strength at the first frequency or a higher frequency. According to an embodiment, howling disturbance may be caused by the personal audio device itself, such as through feedback from other components on the device to the audio signal. In some embodiments, reducing the anti-noise strength at the first frequency or a higher frequency to counteract the howling disturbance may include increasing the leakage in the updating algorithm and reducing the step size in the updating algorithm, both for frequency bins that include the howling disturbance. FIG. 6 is a graph illustrating example adaptive noise cancellation (ANC) system operation for removal of a howling disturbance according to some embodiments of the disclosure. Line 602 illustrates an ANC output signal without howling disturbance removal. Line 604 illustrates an ANC output signal with howling disturbance removal according to some embodiments of the invention.

Figure 7:
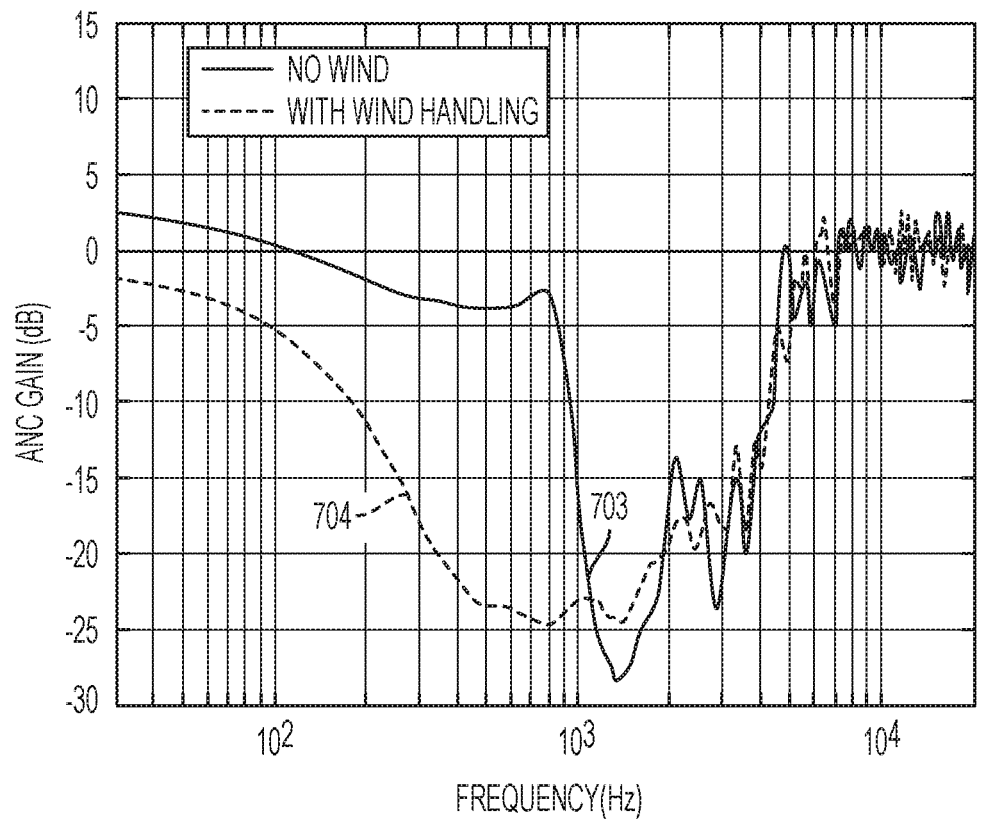
FIG. 7 is a graph illustrating example ANC system operation for removal of a wind disturbance according to some embodiments of the disclosure.

In yet another embodiment, the step of determining if the disturbance is present may include determining a presence of wind-scratch noise, and the step of updating the algorithm of the adaptive filter may include reducing anti-noise strength at the first frequency and generating anti-noise at higher frequency bins. In some embodiments, generating anti-noise at the first frequency to counteract the wind-scratch disturbance may include increasing the leakage in the updating algorithm and reducing the step size in the updating algorithm, both for frequency bins that include the wind-scratch disturbance. FIG. 7 is a graph illustrating example adaptive noise cancellation (ANC) system operation for removal of a wind disturbance according to some embodiments of the disclosure. Line 702 illustrates an ANC output signal without wind-scratch disturbance removal. Line 704 illustrates an ANC output signal with wind-scratch disturbance removal according to some embodiments of the invention.

The schematic flow chart diagrams of FIGS. 3-5 are generally set forth as logical flow chart diagrams. As such, the depicted order and labeled steps are indicative of aspects of the disclosed methods. Other steps and methods may be conceived that are equivalent in function, logic, or effect to one or more steps, or portions thereof, of the illustrated methods. Additionally, the format and symbols employed are provided to explain the logical steps of the methods and are understood not to limit the scope of the methods. Although various arrow types and line types may be employed in the flow chart diagrams, they are understood not to limit the scope of the corresponding methods. Indeed, some arrows or other connectors may be used to indicate only the logical flow of the methods. For instance, an arrow may indicate a waiting or monitoring period of unspecified duration between enumerated steps of the depicted methods. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although ANCs are described in embodiments above, aspects of the disclosed invention may also be applied to other noise cancellation systems. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:
   receiving a first input signal for reproduction through a transducer;
   receiving a second input signal from a reference microphone or an error microphone; and
   updating an algorithm for an adaptive filter based, at least in part, on the first input signal and the second input signal,
   wherein the step of updating the algorithm for the adaptive filter comprises:
      processing the first input signal in a frequency domain to generate coefficient values corresponding to a plurality of frequency bins for the algorithm; and
      updating the coefficient values based on a step size, wherein the step size for a frequency bin is based, at least in part, on a value of the frequency bin and a value of at least one other frequency bin.

2. The method of claim 1, wherein the step of updating the algorithm comprises normalizing the step size based, at least in part, on full band information of the second input signal.

3. The method of claim 1, wherein the step of updating the algorithm comprises normalizing the step size based, at least in part, on the second input signal.

4. The method of claim 1, wherein the step of updating the algorithm comprises normalizing the step size based, at least in part, on a maximum magnitude of full band information of the second input signal.

5. The method of claim 1, wherein the step of updating the algorithm of the adaptive filter comprises calculating the set of coefficient values $w_m^f$ for the plurality of frequency bins n for a transfer function (w(z)) based on:

$$W_m^f(n+1) = (1 - \mu_m \lambda_m) W_m^f(n) + \mu_m \frac{x_m^{f*}(n) e_m^f(n)}{|x_m^f(n)| |x_m^f(n)|_{max}}$$

wherein $\mu_m$ is the step size for frequency bin m,
$\lambda_m$ is signal leakage in frequency bin m,
$x_m^f(n)$ is the second input signal from the reference microphone,
$x_m^{f*}(n)$ is a conjugate of the second input signal from the reference microphone, and
$e_m^f(n)$ is an error signal from an error microphone feedback signal.

6. The method of claim 1, wherein the step of updating the algorithm for the adaptive filter comprises applying magnitude constraints at individual frequency bins.

7. The method of claim 6, wherein the step of updating the algorithm of the adaptive filter comprises calculating the set of coefficient values $w_m^f$ for the plurality of frequency bins n for a transfer function (w(z)) based on:

$$w_m^f(n+1) = \begin{cases} w_m^f(n) + \mu_m \frac{x_m^{f*}(n) e_m^f(n)}{|x_m^f(n)| |x_m^f(n)|_{max}} & |w_m^f(n)| < limiter_m^f \\ (1-\lambda_m) w_m^f(n) & |w_m^f(n)| > limiter_m^f \end{cases}$$

wherein $\mu_m$ is the normalized step size,
$\lambda_m$ is signal leakage in frequency bin m,
$x_m^f(n)$ is the second input signal from the reference microphone,
$x_m^{f*}(n)$ is a conjugate of the second input signal from the reference microphone,
$limiter_m^f$ is a magnitude limit for frequency bin m, and
$e_m^f(n)$ is an error signal from an error microphone feedback signal.

8. The method of claim 6, wherein the step of updating the algorithm of the adaptive filter comprises calculating the set of coefficient values $w_m^f$ for the plurality of frequency bins n for a transfer function (w(z)) based on:

$$w_m^f(n+1) = \begin{cases} w_m^f(n+1) & |w_m^f(n+1)| < limiter_m^f \\ \frac{w_m^f(n+1)}{|w_m^f(n-1)|} limiter_m^f & |w_m^f(n-1)| > limiter_m^f \end{cases},$$

wherein $limiter_m^f$ is a magnitude limit for frequency bin m.

9. The method of claim 1, further comprising:
generating an adaptive noise cancellation (ANC) signal using the adaptive filter; and
generating an output signal for output to the transducer comprising a combination of the first input signal and the adaptive noise cancellation (ANC) signal.

10. An apparatus, comprising:
an audio controller configured to perform steps comprising:
receiving a first input signal for reproduction through a transducer;
receiving a second input signal from a reference microphone or an error signal from an error microphone; and
updating an algorithm for an adaptive filter based, at least in part, on the first input signal and the second input signal,
wherein the step of updating the algorithm for the adaptive filter comprises:
processing the first input signal in a frequency domain to generate coefficient values corresponding to a plurality of frequency bins for the algorithm; and
updating the coefficient values based on a step size, wherein the step size for a frequency bin is based, at least in part, on a value of the frequency bin and a value of at least one other frequency bin.

11. The apparatus of claim 10, wherein the step of updating the algorithm comprises normalizing the step size based, at least in part, on full band information of the second input signal.

12. The apparatus of claim 10, wherein the step of updating the algorithm comprises normalizing the step size based, at least in part, on a maximum magnitude of full band information of the second input signal.

13. The apparatus of claim 10, wherein the step of updating the algorithm of the adaptive filter comprises calculating the set of coefficient values $w_m^f$ for the plurality of frequency bins n for a transfer function (w(z)) based on:

$$W_m^f(n+1) = (1 - \mu_m \lambda_m) W_m^f(n) + \mu_m \frac{x_m^{f*}(n) e_m^f(n)}{|x_m^f(n)| |x_m^f(n)|_{max}}$$

wherein $\mu_m$ is the step size for frequency bin m,
$\lambda_m$ is signal leakage in frequency bin m,
$x_m^f(n)$ is the second input signal from the reference microphone,
$x_m^{f*}(n)$ is a conjugate of the second input signal from the reference microphone,
$limiter_m^f$ is a magnitude limit for frequency bin m, and
$e_m^f(n)$ is an error signal from an error microphone feedback signal.

14. The apparatus of claim 10, wherein the step of updating the algorithm for the adaptive filter comprises applying magnitude constraints at individual frequency bins.

15. The apparatus of claim 14, wherein the step of updating the algorithm of the adaptive filter comprises calculating the set of coefficient values $w_m^f$ for the plurality of frequency bins n for a transfer function (w(z)) based on:

$$w_m^f(n+1) = \begin{cases} w_m^f(n) + \mu_m \frac{x_m^{f*}(n) e_m^f(n)}{|x_m^f(n)| |x_m^f(n)|_{max}} & |w_m^f(n)| < limiter_m^f \\ (1-\lambda_m) w_m^f(n) & |w_m^f(n)| > limiter_m^f \end{cases}$$

wherein $\mu_m$ is the normalized step size,
$\lambda_m$ is signal leakage in frequency bin m,
$x_m^f(n)$ is the second input signal from the reference microphone, $x_m^{f*}(n)$ is a conjugate of the second input signal from the reference microphone, and $e_m^f(n)$ is an error signal from an error microphone feedback signal.

16. The apparatus of claim 14, wherein the step of updating the algorithm of the adaptive filter comprises calculating the set of coefficient values $w_m^f$ for the plurality of frequency bins n for a transfer function (w(z)) based on:

$$w_m^f(n+1) = \begin{cases} w_m^f(n+1) & |w_m^f(n+1)| < limiter_m^f \\ \dfrac{w_m^f(n+1)}{|w_m^f(n-1)|} limiter_m^f & |w_m^f(n-1)| > limiter_m^f \end{cases},$$

wherein $limiter_m^f$ is a magnitude limit for frequency bin m.

17. The apparatus of claim 10, wherein the audio controller is further configured to perform the steps of:
generating an adaptive noise cancellation (ANC) signal using the adaptive filter; and
generating an output signal for output to the transducer comprising a combination of the first input signal and the adaptive noise cancellation (ANC) signal.

* * * * *